United States Patent [19]

Hollenbeck

[11] Patent Number: 5,418,438
[45] Date of Patent: May 23, 1995

[54] DRAFT INDUCER AIR FLOW CONTROL

[75] Inventor: Robert K. Hollenbeck, Fort Wayne, Ind.

[73] Assignee: General Electric Company, Fort Wayne, Ind.

[21] Appl. No.: 25,371

[22] Filed: Feb. 26, 1993

[51] Int. Cl.6 .................... F25B 29/00; H02P 7/00
[52] U.S. Cl. ...................... 318/432; 318/645; 165/16; 165/31
[58] Field of Search ............ 318/138, 254, 481, 599, 318/806, 811, 644, 645, 432, 433; 388/929; 62/186; 165/16, 31, 32; 236/10, 15 C, 15 R; 431/12, 90, 89

[56] References Cited

U.S. PATENT DOCUMENTS

| 4,392,417 | 7/1983 | Johannsen . | |
|---|---|---|---|
| 4,504,881 | 3/1985 | Wada et al. | 361/23 |
| 4,519,540 | 5/1985 | Boulle et al. | 237/7 |
| 4,638,233 | 1/1987 | Erdman | 318/644 |
| 4,645,450 | 2/1987 | West . | |
| 4,648,551 | 3/1987 | Thomspon et al. | 236/49 |
| 4,667,480 | 5/1987 | Bessler | 62/180 |
| 4,703,747 | 11/1987 | Thompson et al. | 126/112 |
| 4,774,656 | 9/1988 | Quatse et al. | 364/900 |
| 4,806,833 | 2/1989 | Young | 318/335 |
| 4,818,924 | 4/1989 | Burney | 318/561 |
| 4,820,317 | 4/1989 | Fahey . | |
| 4,836,096 | 6/1989 | Avery . | |
| 4,858,676 | 8/1989 | Bolfik et al. | 165/2 |
| 4,860,231 | 8/1989 | Ballard et al. | 364/571.01 |
| 4,978,896 | 12/1990 | Shah | 318/254 |
| 5,019,757 | 5/1991 | Beifus | 318/254 |
| 5,075,608 | 12/1991 | Erdman et al. . | |
| 5,144,543 | 9/1992 | Striek et al. | 363/16 |

FOREIGN PATENT DOCUMENTS

| 0073717 | 8/1982 | European Pat. Off. | F23N 1/06 |
|---|---|---|---|
| 0279771 | 2/1988 | European Pat. Off. | F23N 1/04 |
| 0433965A1 | 12/1990 | European Pat. Off. | G05B 19/04 |
| 2547075 | 6/1983 | France | G05B 19/18 |
| 2662751 | 5/1991 | France | F04D 27/00 |
| 2056044A | 7/1980 | United Kingdom | F23N 1/06 |

Primary Examiner—Bentsu Ro
Attorney, Agent, or Firm—Ralph E. Krisher, Jr.

[57] ABSTRACT

A control circuit for a motor driving a fan for inducing a draft in the exhaust of a heating, ventilating and air conditioning (HVAC) system. The control circuit may be used in conjunction with either a variable pressure sensor or one or two discrete pressure sensors. A controller receives information defining the pressure set point. The information may be from a switched register or low or high pressure input signals. The motor speed/torque is increased until the pressure set point is reached.

19 Claims, 6 Drawing Sheets

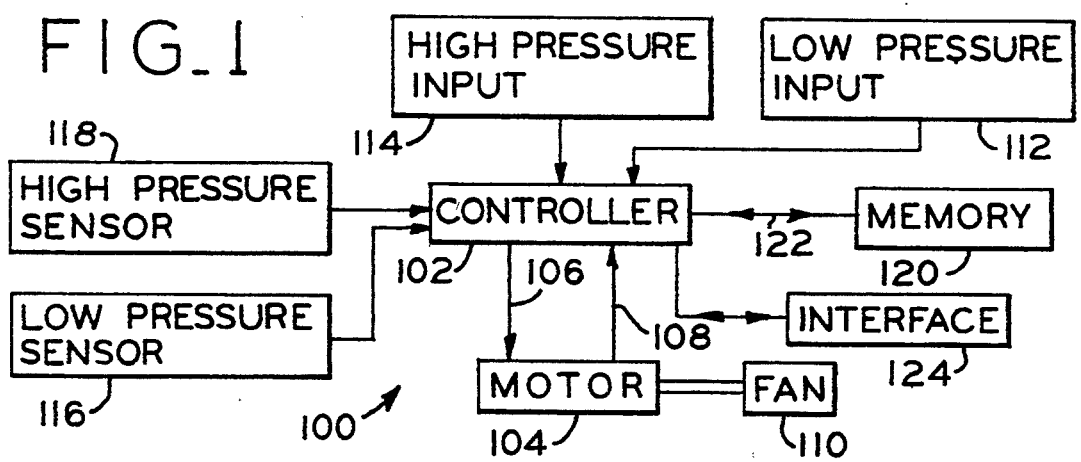
FIG_1
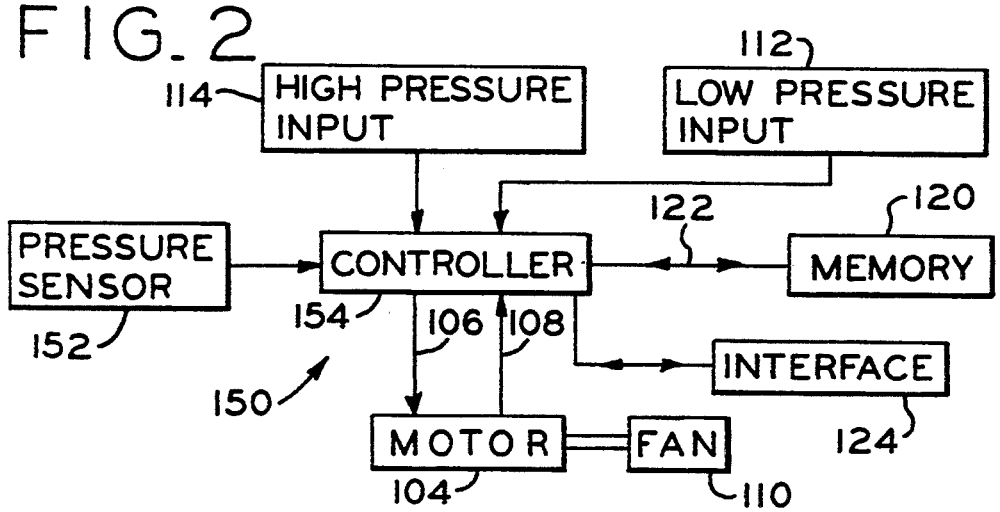
FIG_2
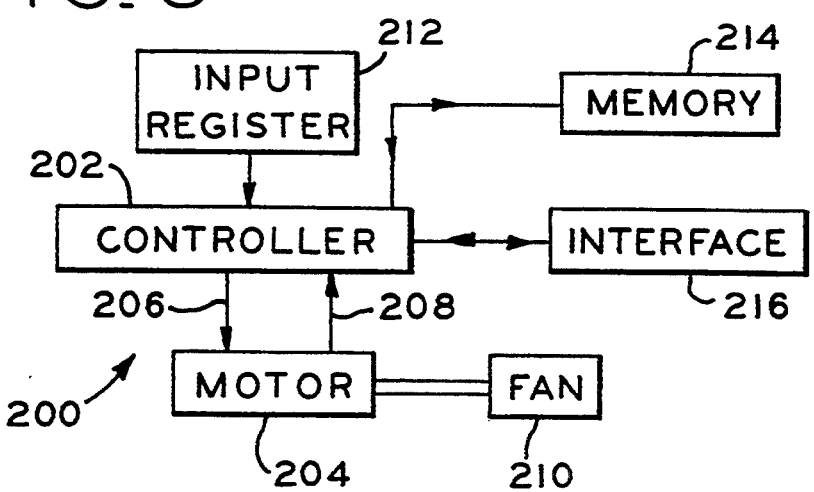
FIG_3

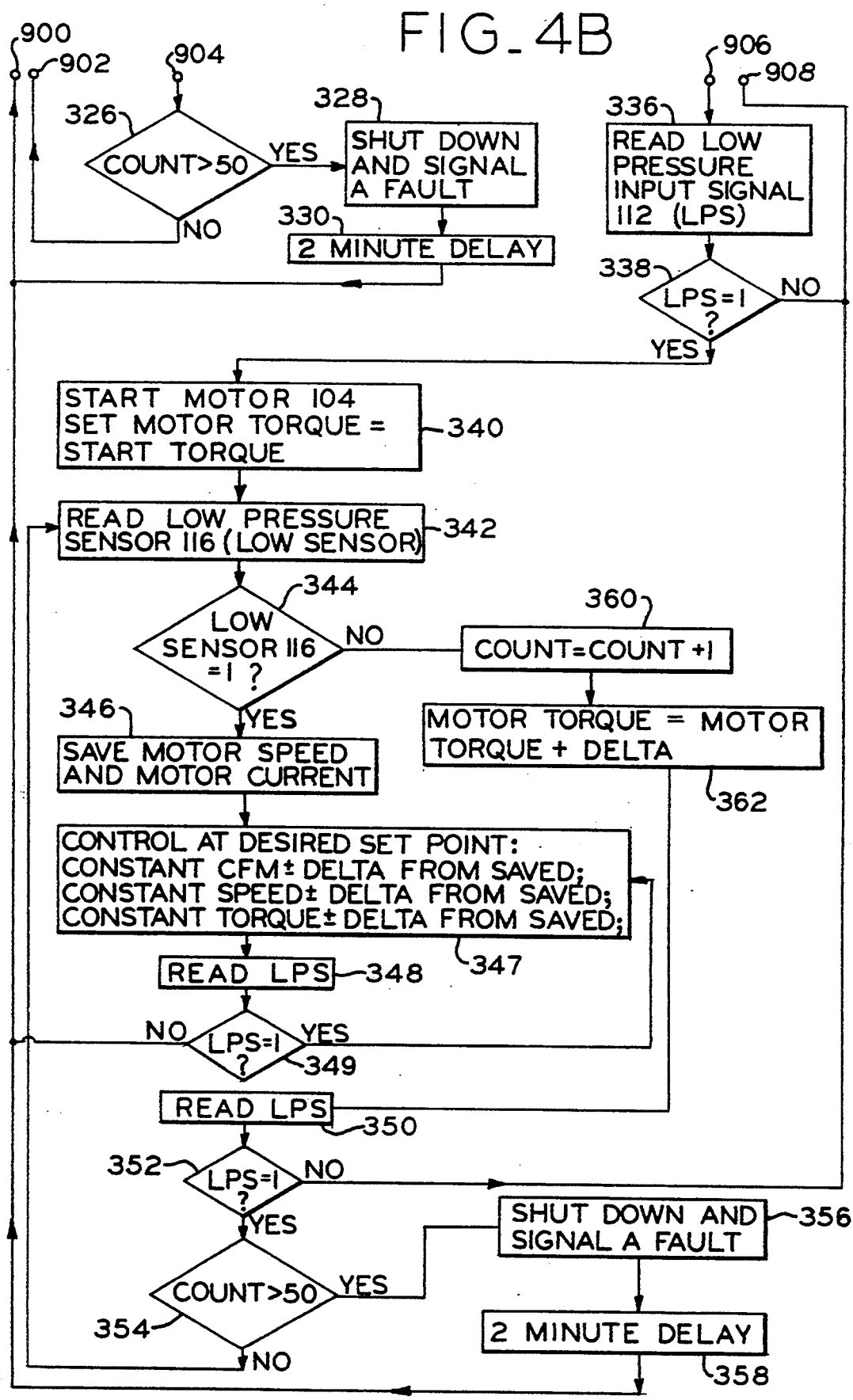

FIG_6

DRAFT INDUCER AIR FLOW CONTROL

BACKGROUND OF THE INVENTION

Copyright ©1993 General Electric Company. A portion of the disclosure of this patent document contains material which is subject to Copyright protection. The Copyright owner has no objection to the facsimile reproduction of any one of the patent document or the patent disclosure, as it appears in the Patent and Trademark Office patent files or records, but otherwise reserves all Copyright rights whatsoever.

The invention generally relates to draft inducers and, in particular, a control for a fan driven motor for inducing a draft in an exhaust.

In a conventional furnace, the exhaust gases from the combustion chamber are carried away by natural convection currents. However, the resultant loss of heat energy in the exhaust gases decreases the overall efficiency of the furnace. In order to improve the efficiency, heat exchangers have been used to extract additional heat from the exhaust gases prior to the time they are vented to the atmosphere. This cools the exhaust gases which reduces the natural convection currents which would otherwise carry the gases away. One solution has been to use a draft inducing fan to exhaust the exhaust gases into the atmosphere.

Prior designs for a draft inducer control system for controlling the exhaust of a furnace have included a pressure transducer located in the venting adjacent the combustion chamber, a speed sensor for the motor, and a torque sensor for the motor. These components have been used to vary the induced draft as a function of the sensed pressure in the combustion chamber. Such a control system is disclosed in U.S. Pat. No. 5,075,608 to David M. Erdman, for example.

While such systems represent an improvement, further improvements in draft inducer control systems, draft inducer apparatus, and methods of control and operation can beneficially increase the efficiency of a furnace. For example, improvements which allow the speed/torque of the motor and the magnitude of the induced draft to be preselected for given operating conditions of the furnace would increase efficiency by more closely matching the induced draft to the requirements of the furnace. Improvements which, allow the preselecting to occur quickly and economically during manufacture or installation of the furnace would also be desirable. Greater versatility of the draft inducer control system in responding to various control signal conditions would also be desirable.

SUMMARY OF THE INVENTION

Among the objects of the invention are to provide an improved draft inducer control system, an improved draft inducer apparatus and improved methods of control and operation which overcome at least some of the disadvantageous conditions described above, an improved draft inducer apparatus and improved methods of control and operation which preselect the induced draft in the exhaust of a furnace as a function of the operating conditions of the furnace, an improved draft inducer apparatus and improved methods of control and operation which control the induced draft in the exhaust of a furnace as a function of the operating conditions of the furnace and of the sensed pressure in the exhaust of the furnace, an improved draft inducer apparatus and improved methods of control and operation which reduce back-drafts and over-drafts which otherwise cause inefficient combustion, and an improved draft inducer apparatus and improved methods of control and operation which are electrically efficient, reliable, economical and convenient to use.

Generally, one form of the invention is a control circuit for use in a heating, ventilating and air conditioning system. The control circuit controls a motor for driving a fan to induce a draft through a vent in the system. The control circuit includes means for indicating an air pressure corresponding to a desired draft. Means senses the air pressure in the vent. Means compares the indicated pressure to the sensed pressure. The control circuit also includes means responsive to the comparing means for increasing the speed/torque of the motor when the sensed pressure is below the indicated pressure and for decreasing the speed/torque of the motor when the sensed pressure is above the indicated pressure. The indicating means of the control circuit may include an input register having one or more switches having states which correspond to one or more preset pressures. The control circuit may also include a controller and an interface connected to the controller. The interface has a first optoisolator for receiving a select signal indicating the selected air pressure and providing to the controller a signal corresponding thereto. The interface has a second optoisolator for receiving a pressure signal indicating the air pressure in the vent and providing to the controller a signal corresponding thereto.

A further form of the invention is a control circuit for use in a heating, ventilating and air conditioning system. The control circuit controls a motor for driving a fan to induce a draft through a vent in the system. The control circuit includes means for indicating a first or second air pressure corresponding to a desired draft. Means senses the air pressure in the vent. Means compares the first pressure to the sensed pressure. The control circuit further includes means, responsive to the comparing means, for increasing the speed/torque of the motor at a first preset rate when the sensed pressure is below the first pressure and for decreasing the speed/torque of the motor at a second preset rate when the sensed pressure is above the first pressure. The control circuit also includes means, responsive to the indicating means and to the comparing means for proportionately increasing the first and second preset rates as a function of the ratios of the second pressure to the first pressure when the second pressure is indicated. The control circuit may include a controller having an input for receiving a signal corresponding to the indicated air pressure, an input for receiving a signal from the sensing means corresponding to the sensed air pressure and an input for receiving a signal representative of the motor speed/torque. The controller has an output for providing a signal representative of the speed/torque of the motor.

A still further form of the invention is a control circuit for use in a heating, ventilating and air conditioning system. The control circuit controls a motor for driving a fan to induce a draft through a vent in the system. The control circuit includes means for indicating a first or second air pressure level corresponding to a desired draft in the vent. A first pressure sensor senses whether the air pressure in the vent is greater than the first indicated air pressure level. A second pressure sensor senses whether the air pressure in the vent is greater than the second indicated air pressure level. Means compares the indicated air pressure level to the pressure sensed by the pressure sensor corresponding to the indicated air pressure level. The control circuit also includes means responsive to the comparing means for increasing the speed/torque of the motor when the corresponding sensed pressure is below the indicated air pressure level and for decreasing the speed/torque of the motor when the corresponding sensed pressure is above the indicated air pressure level.

A still further form of the invention is a method for controlling a motor for driving a fan to induce a draft through a vent in a heating, ventilating and air conditioning system. The method includes indicating an air pressure corresponding to a desired draft and sensing the air pressure in the vent. The method also includes comparing the indicated pressure to the sensed pressure. The method also includes increasing the speed/torque of the motor when the comparing step indicates that the sensed pressure is below the indicated pressure and decreasing the speed/torque of the motor when the comparing step indicates that the sensed pressure is above the indicated pressure.

Yet still a further form of the invention is a method for controlling a motor for driving a fan to induce a draft through a vent in a heating, ventilating and air conditioning system. The method includes indicating a first or second air pressure corresponding to a desired draft and sensing the air pressure in the vent. The method also includes comparing the first pressure to the sensed pressure. The method also includes increasing the speed/torque of the motor at a first preset rate when the comparing step indicates that the sensed pressure is below the first pressure and decreasing the speed/torque of the motor at a second preset rate when the comparing step indicates that the sensed pressure is above the first pressure. The method also includes proportionately increasing the first and second preset rates as a function of the ratios of the second pressure to the first pressure when the second pressure is indicated.

But yet still another form of the invention is a control circuit for use in a heating, ventilating and air conditioning system. The control circuit controls a motor for driving a fan to induce a draft through a vent in the system. The control circuit includes means for indicating a first or second air pressure level corresponding to a desired draft in the vent. A first pressure sensor senses whether the air pressure in the vent is greater than the first indicated air pressure level, A second pressure sensor senses whether the air pressure in the vent is greater than the second indicated air pressure level, Means compares the indicated air pressure level to the pressure sensed by the first pressure sensor. Means compares the indicated air pressure level to the pressure sensed by the second pressure sensor. The control circuit also includes means responsive to both comparing means for increasing the speed/torque of the motor when the sensed pressure is below the indicated air pressure level and for decreasing the speed/torque of the motor when the corresponding sensed pressure is above the indicated air pressure level.

Other objects and features will be in part apparent and in part pointed out hereinafter.

BRIEF DESCRIPTION OF THE DRAWINGS

FIG. 1 is a block diagram of a control circuit of the invention including two pressure sensors and two pressure select inputs.

FIG. 2 is a block diagram of a control circuit of the invention including one pressure sensor and two pressure select inputs.

FIG. 3 is a block diagram of a control circuit of the invention including a register providing the pressure select inputs.

FIGS. 4A and 4B are a flow chart illustrating one preferred embodiment of the operation of the control circuit of FIG. 1.

Corresponding reference characters indicate corresponding parts through the drawings.

DETAILED DESCRIPTION OF THE PREFERRED EMBODIMENTS

Figure 4A:
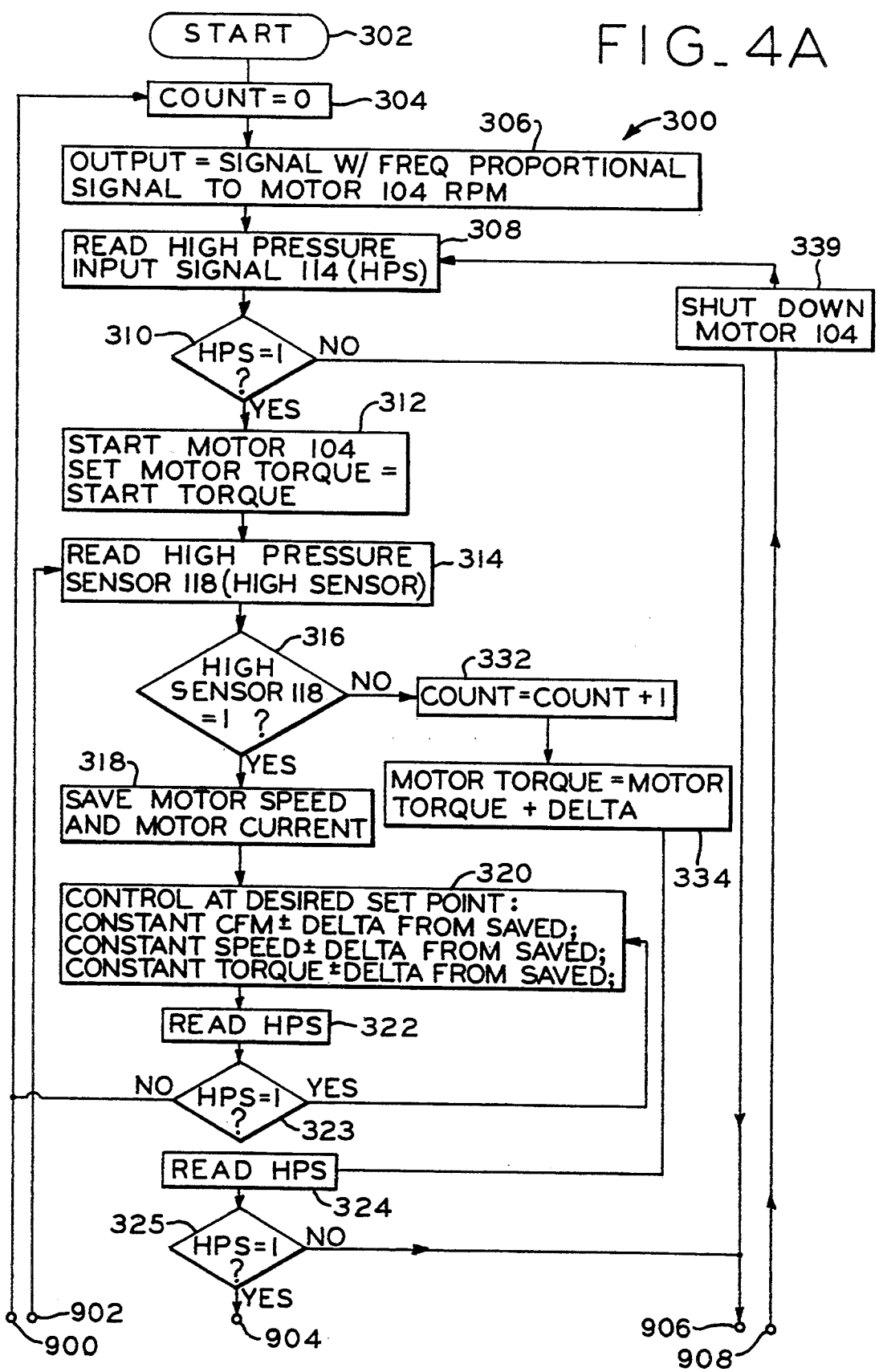

Referring now to FIG. 1, one preferred embodiment of a control circuit 100 for a draft inducer variable speed motor of the present invention is shown. Control circuit 100 includes a controller 102 which is connected to a motor 104. Controller 102 is preferably mounted within the housing of motor 104. Motor 104 may be a single phase motor such as described in the copending, coassigned application entitled "Single Phase Electronically Commutated Motor System and Method" filed Feb. 22, 1993, Ser. No. 08/023,790, the entire disclosure of which is incorporated herein by reference. Controller 102 sends control commands to motor 104 via a line 106 and receives speed or torque feedback from motor 104 via a line 108. Motor 104 is coupled to a fan 110 for inducing a draft in a vent (not shown) of a conventional heating, ventilating, and air-conditioning system.

Controller 102 is connected to a low pressure input 112 and a high pressure input 114. Inputs 112 and 114 indicate to controller 102 whether a low draft or a high draft is needed in the vent. Inputs 112 and 114 may take the form of manual switches or may be automatically controlled by the main controller for the heating, ventilating, and air-conditioning system via an interface 124.

Controller 102 is also connected to a low pressure sensor 116 and to a high pressure sensor 118. Pressure sensors 116 and 118 are in an open or closed condition depending on whether the air pressure in the vent exceeds a preset level for each of the sensors. In the alternative, sensors 116 and 118 may be variable pressure sensors which output a signal having a variable frequency, amplitude, duty cycle or like characteristic as a function of the sensed pressure in the vent. The air pressure in the vent increases as the draft induced by fan 110 increases. Controller 102 is also connected to a memory 120 for storing and retrieving data via a line 122.

Controller 102 outputs a control signal via interface 124. The control signal may take the form of an isolated transistor switch closure with the following functions: (1) when motor 104 is in the starting mode and pressure sensors 116 and 118 are open so that the draft induced in the vent is below the requested CFM level and the pressure is below the requested pressure, the control signal from interface 124 is an alternating current signal having a frequency proportional to the RPM of motor 104; (2) when motor 104 is in a locked rotor condition, the control signal from interface 124 represents a closed switch condition; (3) widen low pressure sensor 116 is closed, the control signal from interface 124 represents an open switch condition; and (4) when the requested pressure level is not achieved in the vent within a specified time, the control signal from interface 124 represents a closed switch condition, thereby overriding the open switch condition caused by the opening of low pressure switch 116. Alternatively, depending on design requirements, the control signal may be an AC signal have a frequency corresponding to the RPM of motor 104 inside of the operating range and open switch to signal a fault outside of the operating range.

During operation when there is no input signal from inputs 112 and 114, controller 102 removes all electrical power from motor 104. When low pressure input 112 signals controller 102, controller 102 increases the speed/torque of motor 104 at a first preset rate until the draft induced by fan 110 causes low pressure sensor 116 to close. Closure of sensor 116 indicates that the pressure in the vent is greater than the preset level for sensor 116. Similarly, controller 102 decreases the speed/torque of motor 104 at a second preset rate when the sensed pressure in the vent rises above the preset level for sensor 116. Controller 102 thereafter maintains the speed/torque of motor 104 sufficient to keep low pressure sensor 116 closed. This is accomplished through use of conventional algorithms to set the CFM through the vent or the speed of motor 104 as a function of the motor speed and motor current at which sensor 116 first closes.

When controller 102 receives a signal from high pressure input 114, it increases the speed/torque of motor 104 at the first preset rate until fan 110 induces a draft in the vent sufficient to close high pressure sensor 118. Closure of sensor 118 indicates that the pressure in the vent is greater than the preset level for sensor 118. Similarly, controller 102 decreases the speed/torque of motor 104 at the second preset rate when the sensed pressure in the vent rises above the preset level for sensor 118. Controller 102 thereafter maintains the speed/torque of motor 104 sufficient to keep high pressure sensor 118 closed. Again, this is accomplished through use of conventional algorithms to set the CFM through the vent or the speed of motor 104 as a function of the motor speed and motor current at which sensor 116 first closes.

If controller 102 simultaneously senses a signal from inputs 112 and 114, the controller 102 sends an error signal via interface 124 to indicate to the main control of the heating, ventilating, and air-conditioning system that an error has occurred. Controller 102 will attempt to restart motor 104 if the error condition is removed and one of the two inputs 112 and 114 signals is active. It will be seen within the above that the operating points of control circuit 100 can be advantageously changed during manufacture or installation of the furnace by simply replacing pressure sensors 116 and 118 with pressure sensors having different preset pressure levels.

FIG. 2 shows another preferred embodiment of the invention in a circuit 150. Circuit 150 is similar to circuit 100 of FIG. 1 with the exception that a single pressure sensor 152 in circuit 150 replaces pressure sensors 116 and 118 in circuit 100. Accordingly, circuit 150 includes a controller 154 for controlling motor 104 with only a single pressure sensor. Again, controller 154 is preferably mounted within the housing of motor 104.

In operation, controller 154 turns off motor 104 when no signal is present from inputs 112 and 114. When controller 154 senses a signal from low pressure input 112, controller 154 increases the speed/torque of motor 104 at a first preset rate until the draft induced by fan 110 creates sufficient pressure to close pressure sensor 152. Closure of sensor 152 indicates that the pressure in the vent is greater than the preset level for sensor 152. Similarly, controller 154 decreases the speed/torque of motor 104 at a second preset rate when the sensed pressure in the vent rises above the preset level for sensor 152. Controller 154 thereafter maintains the speed/torque of motor 104 sufficient to keep pressure sensor 152 closed. When controller 154 senses a signal from high pressure input 114, controller 154 increases the speed/torque of motor 104 by a fixed amount above the point of operation for the low pressure mode. The output signals sent via interface 124 by controller 154 during operation correspond to the signals sent by controller 102 via interface 124 in FIG. 1. It will be seen within the above that the operating points of control circuit 150 can be advantageously changed during manufacture or installation of the furnace by simply replacing pressure sensor 152 with a pressure sensor having a different preset pressure level.

FIG. 3 shows a circuit 200 comprising yet another preferred embodiment of the invention. Circuit 200 includes a controller 202 connected to a motor 204. Controller 202 sends control commands to motor 204 via a line 206 and receives speed or torque feedback from motor 204 via a line 208. Motor 204 is coupled to a fan 210 for inducing a draft in a vent (not shown) of a heating, ventilating, and air-conditioning system. Controller 202 receives an input signal from an input register 212 which may, for example, take the form of a manual switch. Controller 202 is also connected to a memory 214 for storing and recalling pertinent data. Controller 202 is also connected to an interface 216 for sending/receiving signals to/from the main control of the heating, ventilating, and air-conditioning system.

In operation, controller 202 receives a signal from input register 212 corresponding to a predetermined speed/torque setting for motor 204. Controller 202 responds to the input signal by controlling motor 204 to operate at the predetermined speed/torque level. For example, input register 212 may input one of two signals corresponding to high heat or low heat to cause motor 204 and fan 210 to induce a draft at one of two different constant CFM air flows which are optimum for high heat and low heat, respectively. Alternatively, input register 212 may output one of a plurality of signals corresponding to a plurality of CFM air flows for various operating conditions. The output signal sent by controller 202 via interface 216 is an isolated transistor switch closure which occurs when motor 204 does not achieve the requested speed/torque level corresponding to the requested CFM level in a predetermined period of time. During normal operation, the isolated transistor of interface 216 remains open.

For each of circuits 100, 150, and 200 in FIGS. 1–3, the respective controllers 102, 154, and 200 may receive commands via interfaces 124, 124 and 216 from the main controller for the heating, ventilating, and air-conditioning system. Accordingly, controllers 102, 154, and 202 may be operated in a slave mode whereby control is largely passed to the main controller for the HVAC system or may be operated autonomously. When an error is detected, for example, because motor 104 or 204 failed to reach the operating speed/torque within a predetermined period of time or because the induced draft failed to create adequate pressure in the vent within a predetermined period of time, the respective controller 102, 154, or 202 will shut down the associated motor 104, 104 or 204. In the autonomous mode, the respective controller will attempt to restart the respective motor within a predetermined period of time, such as two minutes. In the slave mode, the respective controller will wait for a signal from the main controller of the HVAC system before attempting to restart the motor 104, 104 or 204. It is also contemplated within the scope of the invention that the main controller in the HVAC system (not shown) sends control signals via interfaces 124, 124, and 216 to controllers 102, 154, and 202, respectively, in place of the input signals provided by inputs 112/114, 112/114, and 212. The main controllers thereby control the CFM airflows and pressures in the vents of the HVAC system.

Figure 5:
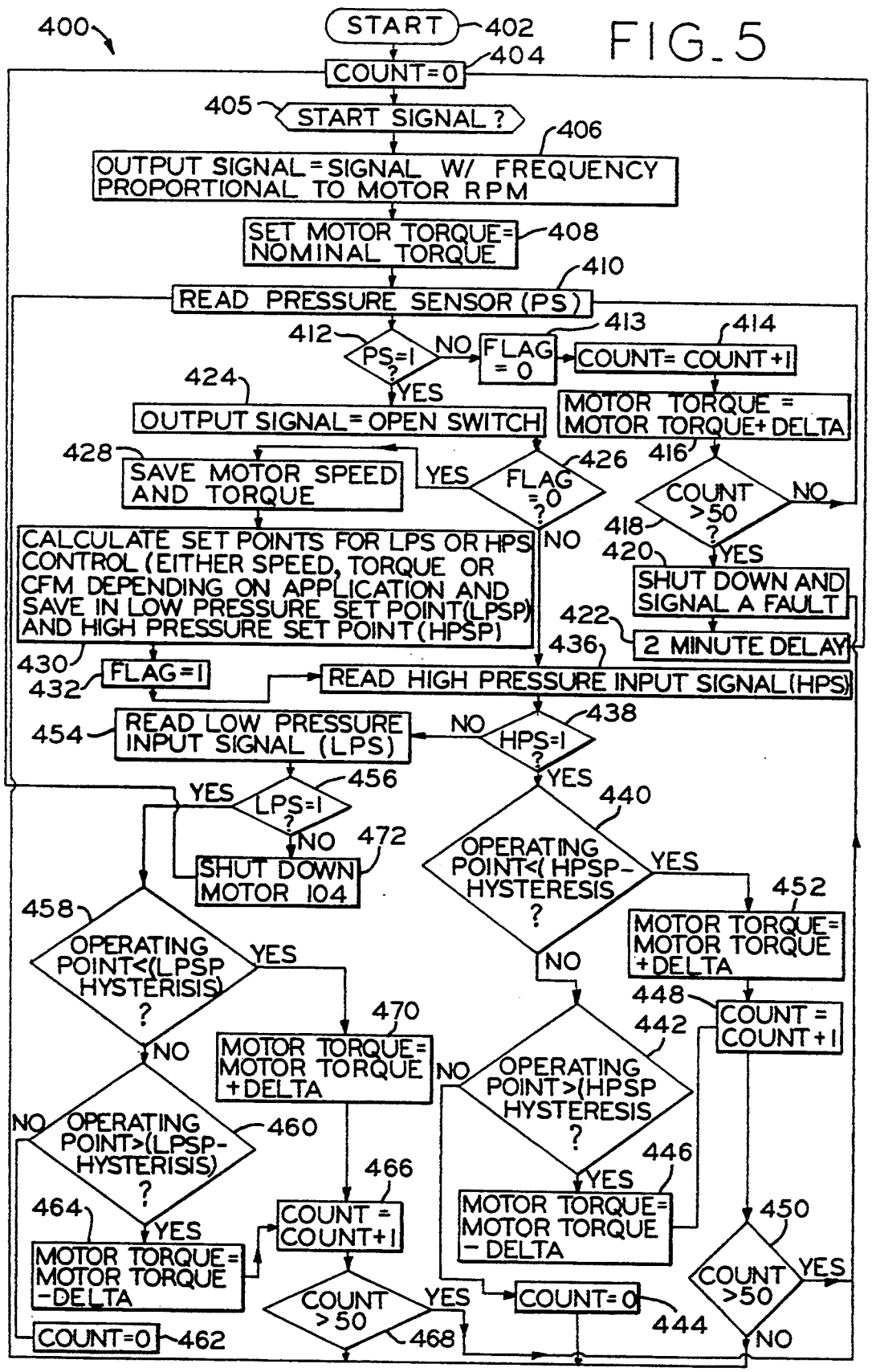
FIG. 5 is a flow chart illustrating one preferred embodiment of the operation of the control circuit of FIG. 2.
Figure 6:
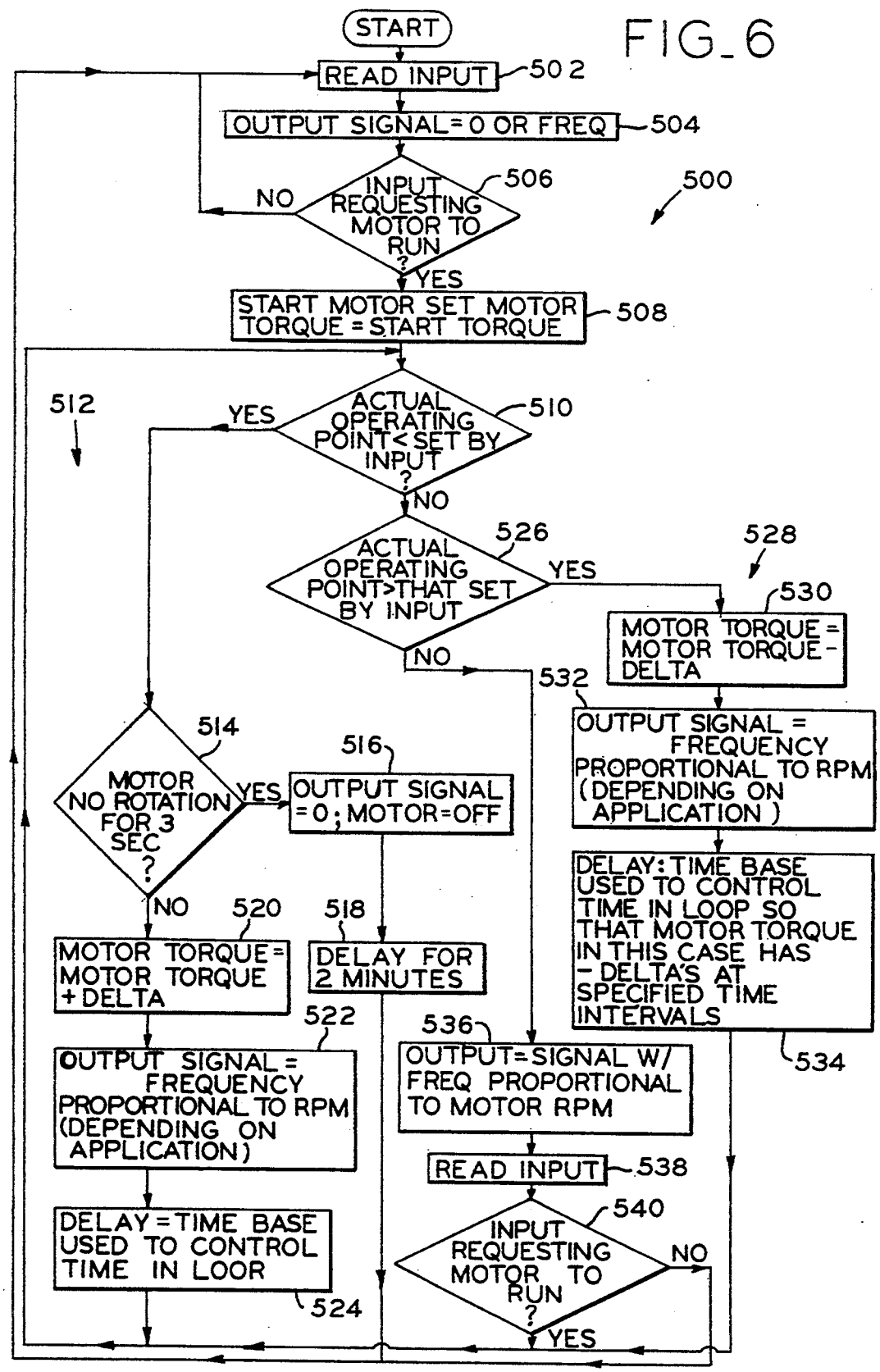
FIG. 6 is a flow chart illustrating one preferred embodiment of the operation of the control circuit of FIG. 3.

FIGS. 4–6 show flow charts for operating the controllers 102, 154 and 202 of FIGS. 1–3. In each of FIGS. 4–6, terminals referred to by a matching 900 series number are assumed to be connected together from one figure to the next without further discussion.

FIG. 4 shows a flow chart 300 for operating controller 102 of FIG. 1. Flow chart 300 begins at a start step 302. Controller 102 sets a count variable equal to zero in a step 304. In a step 306, controller 102 sends an output signal via interface 124 which comprises a signal having a frequency proportional to the speed/torque of motor 104. Controller 102 reads the high pressure input signal (HPS) from high pressure input 114 in a step 308. Controller 102 tests whether the high pressure input signal is on or off in a step 310. The high pressure input signal takes the form of a logical input. If the voltage of the high pressure input signal is high corresponding to a logic level ONE, then high pressure input 114 is considered to be requesting high pressure. If the high pressure input signal is a low voltage corresponding to a logic level ZERO, then controller 102 deems that high pressure input 114 is not requesting high pressure.

Accordingly, if controller 102 determines that the high pressure input signal is a logic level ONE in step 310, then controller 102 starts motor 104 and sets the motor speed/torque variable equal to the start speed/torque value stored in;memory 120 in a step 312. If startup procedures peculiar to the particular type of motor used for motor 104 are required, there are implemented by controller 102 before it proceeds to another step. Controller 102 then reads high pressure sensor 118 in a step 314 and tests whether high pressure sensor 118 is closed in a step 316. If sensor 118 is closed, controller 102 saves the motor speed and motor current settings in memory 120 in a step 318. Controller 102 then proceeds to a step 320 where it controls motor 104 at the desired set point to keep sensor 118 closed. Controller 102 thereby maintains a constant CFM draft in the vent of the HVAC system within a tolerance of +/−delta from the stored value. Depending on the design requirements, controller 102 could also maintain motor 104 at a constant RPM +/−delta from the stored value or maintain motor 104 at a constant torque +/−delta from the stored value. Controller 102 reads the high pressure input signal from high pressure input 114 in a step 322 and tests whether a high pressure input signal is present at step 323. If the high pressure input signal is present, controller 102 returns to step 320. If the signal is not present, controller 102 returns to step 304.

Returning to step 316, if controller 102 senses that high pressure sensor 118 is not closed in step 316, controller 102 increments the count variable by one in a step 332. Controller 102 increments the motor speed/torque variable by delta in a step 334 and then proceeds to step 324 where controller 102 reads the high pressure input signal from high pressure input 114. Controller 102 tests whether the high pressure sensor is closed in a step 325. If it is closed, controller 102 proceeds to a step 326 where it tests whether the count variable is greater than 50. If the count variable is not greater than 50 in step 326, controller 102 returns back to step 314. If the count variable is greater than 50 in step 326, then controller 102 proceeds to a step 328 where it shuts down power to motor 104 and outputs a fault signal via interface 124. Controller 102 proceeds to a step 330 and times out a two minute delay whereafter it returns to step 304 to attempt to restart motor 104.

Returning to steps 310 and 325, if controller 102 determines in either step that the high pressure input 114 was not a logic level ONE indicating that high pressure was requested, then controller 102 proceeds to a step 336 where it reads the low pressure input signal from low pressure input 112. If controller 102 determines in a step 338 that the low pressure input signal from low pressure input 112 is also not present, then controller 102 returns to a step 339 where it shuts down motor 104. Controller 102 then proceeds to step 308 to again determine whether a high pressure input signal is present from high pressure input 114. Controller 102 cycles back and forth reading the signals from inputs 112 and 114 in this manner until an input is detected indicating that motor 104 is to be energized.

If controller 102 determines in step 338 that the low pressure input signal is present at low pressure input 112, then controller 102 starts motor 104 and sets the motor speed/torque variable equal to the start speed/torque value stored in memory 120 in a step 340. If startup procedures peculiar to the particular type of motor used for motor 104 are required, there are implemented by controller 102 before it proceeds to another step. Controller 102 then reads the low pressure input signal from low pressure sensor 116 in a step 342. Controller 102 tests whether the low pressure sensor 116 is closed in a step 344. If sensor 116 is closed, controller 102 saves the motor speed and motor current settings in memory 120 in a step 346. Controller 102 then proceeds to a step 347 where it controls motor 104 at the desired set point to keep sensor 116 closed. Controller 102 thereby maintains a constant CFM draft in the vent of the HVAC system within a tolerance of +/−delta from the stored value. Depending oil the design requirements, controller 102 could also maintain motor 104 at a constant RPM +/−delta from the stored value or maintain motor 104 at a constant torque +/−delta from the stored value. Controller 102 reads the low pressure input in a step 348. Controller 102 tests whether a low pressure input signal is present at a step 349. If the low pressure input signal is present, controller 102 returns to step 347. If the signal is not present, controller 102 returns to step 304.

Returning to step 344, if controller 102 determines that low pressure sensor 116 was not closed in step 344, then controller 102 increments the count variable by one in a step 360. Controller 102 increments the motor speed/torque variable by delta in a step 362 and reads the low pressure input 112 in a step 350. If controller 102 determines that low pressure has been signalled by low pressure input 112 in a step 352, then controller 102 proceeds to a step 354 where it determines whether the count variable is greater than 50. If the count variable is not greater than 50, then controller 102 returns to step 342. If the count variable is greater than 50, then controller 102 proceeds to a step 356 where it shuts down all power to motor 104 and outputs a fault signal via interface 124. Controller 102 times out a two minutes delay in a step 358. Controller 102 then returns to step 304.

Returning to step 352, of controller 102 determines that there was no signal from low pressure input 112 in step 352, then controller 102 returns to step 339 to shut down motor 104. Controller 102 then proceeds to step 308 to determine whether high pressure has been requested.

FIG. 5 shows a flow chart 400 for operating controller 154 of FIG. 2. Flow chart 400 begins at a start step 402. Controller 154 sets a variable labelled count equal to zero in step 404. Controller 154 thereafter waits for a start signal in step 405. The start signal may be generated by the main controller for the HVAC system and indicates that motor 104 should be started. During the period when motor 104 is being started, controller 154 outputs a signal having a frequency proportional to the speed/torque of motor 104 in a step 406 via interface 124. Controller 154 sets a variable labelled "motor speed/torque" equal to a nominal speed/torque value stored in memory 120 in a step 408. If startup procedures peculiar to the particular type of motor used for motor 104 are required, there are implemented by controller 154 before it proceeds to another step. The variable "motor speed/torque" is used by controller 154 in setting the speed/torque of motor 104. Controller 154 reads pressure sensor 152 in a step 410. If controller 154 determines via a step 412 that pressure sensor 152 is not closed, then controller 154 sets a variable labelled "flag" equal to zero in a step 413 and increments the count variable by one in a step 414. Controller 154 increments the motor speed/torque variable by delta in a step 416. Controller 154 tests whether the count variable is greater than 50 in a step 418. If the count variable is not greater than 50, then controller 154 returns to step 410. If the count variable is greater than 50, indicating that too much time has been taken for motor 104 to reach its full load operating condition, then controller 154 turns off all power to motor 104 and signals a fault via interface 124 in a step 420. Controller 154 then times out a two minute delay in a step 422 before returning to step 404 to attempt to restart motor 104 another time.

Returning to step 412, if controller 154 determines that pressure sensor 152 is closed in step 412, then controller 154 outputs an open switch signal via interface 124 in a step 424. Controller 154 tests whether the flag variable is equal to zero in a step 426. If the flag variable equals zero, it means that this is the first time that the pressure sensor 152 has closed. The operating parameters occurring at this time indicate the duct loading. Accordingly, controller 154 saves the motor speed data and torque/current for the motor in a step 428.

The controller now knows the motor speed, motor torque/current, and related CFM through the vent in which pressure sensor 152 is located. From this data, controller 154 calculates and stores the operating set points for motor 104 in a step 430 which correspond to: (1) the low pressure/low CFM setting ("LPS") which is stored in memory 120 as the low pressure set point ("LPSP"); and (2) the high pressure/high CFM setting ("HPS") which is stored in memory 120 as the high pressure set point ("HPSP"). The LPSP and HPSP can be calculated and stored as a function of speed, torque, or CFM depending on the application. The operating point at which pressure sensor 152 is first set to close (and therefore the operating point where the data for calculating the LPSP and HPSP is collected in step 428) can be set to correspond Lo the LPSP or the HPSP. It has been found preferable, however, to choose the data collection point midway between I, PSP and HPSP so that the error in calculating each is roughly divided between them. Finally, for furnaces,having combustion chambers which require more than two draft levels during operation, step 430 can be expanded to have controller 154 calculate and store additional set points for the additional draft levels. The flag variable is set equal to one in a step 432 so that the set points are calculated one time for a given startup. If it is found desirable to recalculate the set points after startup, flow chart 400 can be changed to access steps 428 and 430 at the appropriate times.

After step 432 or if the flag variable is not equal to zero in step 426, controller 154 reads the high pressure input in a step 436. Controller 154 tests whether the high pressure signal is present in a step 438. If the high pressure signal is present, controller 154 tests whether the current operating point of motor 104 is less than HPSP in a step 440. In performing this test, HPSP is broadened by a hysteresis variable which enlarges the range of acceptable operating points for which controller 154 will make no change in the operating parameters for motor 104. If the current operating point is not less than HPSP in step 440, then controller 154 tests whether the current operating point is greater than HPSP/hysteresis in a step 442. If the current operating point is not greater than HPSP in step 442, then controller 154 sets the count variable equal to zero in step 444 and returns to step 410. If the current operating point is greater than HPSP in step 442, then controller 154 decreases the motor torque by delta in a step 446 and increments the count by one in a step 448. Controller 154 then tests whether the count variable is greater than 50 in a step 450. If it is, controller 154 returns to step 420. If it is not, controller 154 returns to step 410. Finally, in step 440, if controller 154 determines that the current operating point is less than HPSP, then controller 154 increases the motor torque by delta in a step 452 before proceeding to step 448.

Returning to step 438, if controller 154 determines that there was no high pressure input signal in step 438, then it reads the low pressure input (LPS) from low pressure input 112 in a step 454. Controller 154 tests whether the low pressure signal is present in a step 456. If the low pressure signal is present, controller 154 tests whether the current operating point of motor 104 is less than LPSP in a step 458. In performing this test, as above, LPSP is broadened by a hysteresis variable which enlarges the range of acceptable operating points for which controller 154 will make no change in the operating parameters for motor 104. If the current operating point is not less than LPSP in step 458 then controller 154 tests whether the current operating point is greater than LPSP/hysteresis in a step 460. If the current operating point is not greater than LPSP in step 460, then controller 154 sets the count variable equal to zero in step 462 and returns to step 410. If the current operating point is greater than LPSP in step 460, then controller 154 decreases the motor torque by delta in a step 464 and increments the count by one in a step 466. Controller 154 then tests whether the count variable is greater than 50 in a step 468. If it is, controller 154 returns to step 420. If it is not, controller 154 returns to step 410. Finally, in step 458, if controller 154 determines that the current operating point is less than LPSP, then controller 154 increases the motor torque by delta in a step 470 before proceeding to step 466. Finally, in step 456, if controller 154 determines that the low pressure signal is not present, it shuts off power to motor 104 in a step 472 and returns to step 404.

Figure 7:
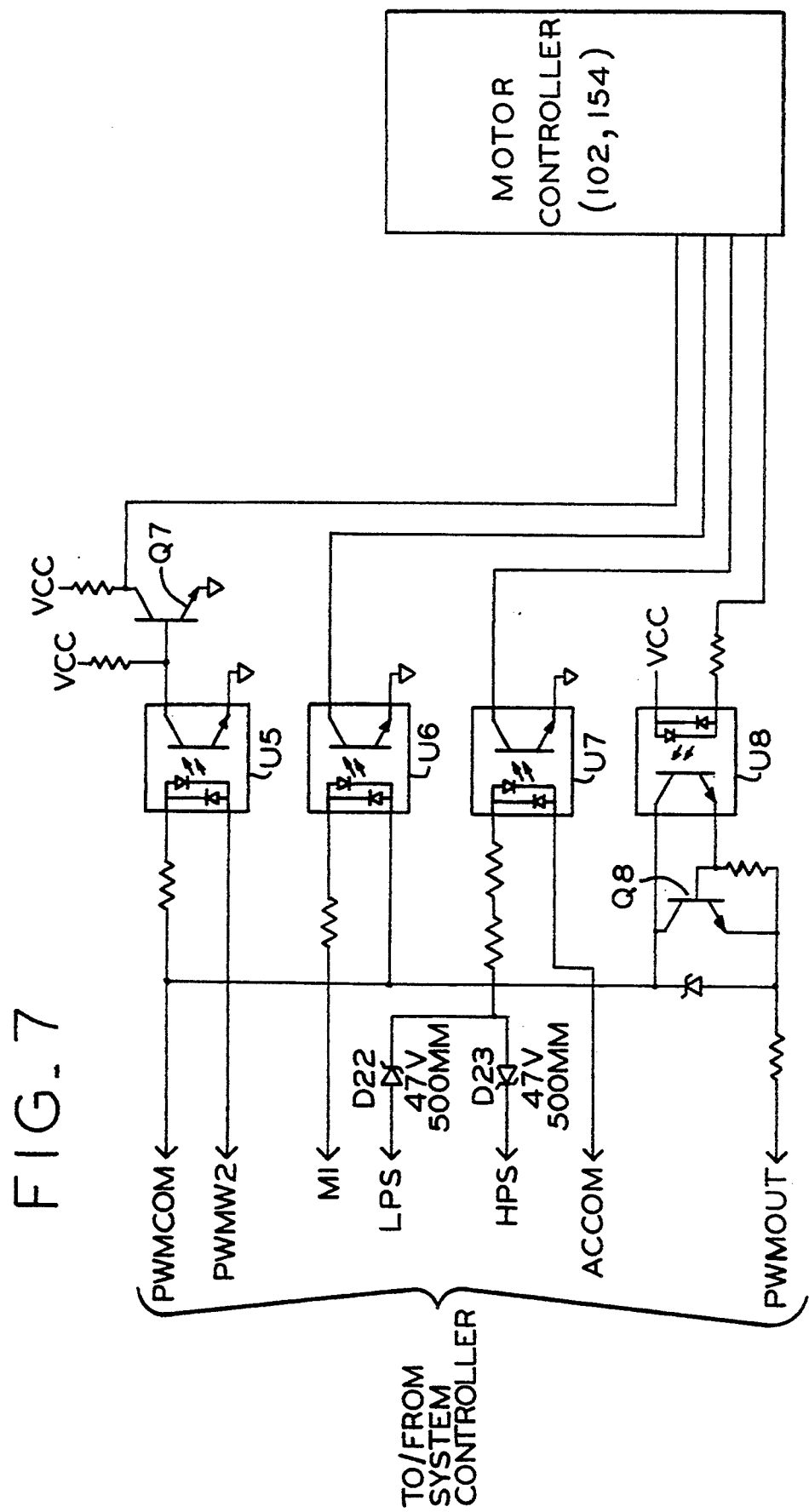
FIG. 7 is a circuit diagram of one preferred embodiment of the interface including optoisolators and wherein the interface receives the pressure sensor signals and the pressure select input signals.

In the block diagrams illustrated in FIGS. 1 and 2, the control circuit of the invention is illustrated such float the controller 102, 154 receives a signal directly indicating the desired pressure level. It is also contemplated that the control circuit of the invention may operate such that the controller would be responsive to signals provided via an optoisolator interface 124, shown in FIG. 7. In particular, interface 124 would be located between the system controller and the motor controller, such as a motor controller for a single phase motor as described in co-assigned Ser. No. 08/023,790 filed Feb. 22, 1993, the entire disclosure of which is incorporated herein by reference. In general, it is contemplated that controller 102, 154 may operate in a proportional torque mode or in a pressure switch mode. In either mode, a 12 VDC signal is applied to a terminal PWMCOM.

During operation in the proportional torque mode, a terminal PWMW2 provides a signal having a duty cycle corresponding to the percent of desired torque. In response, opto-coupler U5 would selectively close a transistor switch Q7 to provide a corresponding pulse width modulated signal to the motor controller.

During operation in a pressure switch mode, a terminal W1 provides the low pressure command signal. In particular, terminal W1 is grounded actuating opto-coupler U6 to provide a low pressure select signal to the motor controller. A terminal LPS from the low pressure sensor, which provides a 24 volt, 60 Hz ac signal, conducts a positive ball wave via diode D22 to intermittently turn on opto-coupler U7 to indicate that the low pressure level has been attained and to control a constant CFM based on the low pressure sensor. A terminal PWMW2 provides the high pressure command signal. In particular, terminal PWMW2 is grounded actuating opto-coupler U5 to provide a high pressure select signal to the motor controller. A terminal HPS from the high pressure sensor, which provides a 24 volt, 60 Hz ac signal, conducts a negative half wave via diode D23. As a result, when the high pressure is reached, a full wave ac signal is provided by the combination of the positive going half wave provided by terminal LPS via diode D22 and the negative half wave provided by terminal HPS via diode D23 so that opto-coupler U7 is constantly on to indicate that the high pressure level has been attained and to control a constant CFM based on the high pressure sensor.

Alternatively, when no proportional torque mode is required, only terminals W1 and PWMW2 are necessary to provide information to the motor controller to indicate low pressure or high pressure operation. In the low pressure mode, terminal W1 is grounded to activate opto-coupler U6 and terminal PWMW2 is open circuited so that opto-coupler U5 is inactive. This results in a low pressure constant CFM mode. For high pressure operation, both terminals W1 add PWMW2 are grounded to activate both motor controller. Effectively, the PWMW2 terminal is an opto-couplers U5 and U6 to provide both signals to the override terminal providing a signal which, when present results in high pressure constant CFM operation. Terminal ACCOM is an alternating current common terminal providing a ground to the AC signals applied to terminals LPS and HPS. An optional terminal PWMOUT may be used to provide a tachometer signal to the system controller in which case opto-coupler U8 selectively turns on and off a transistor Q8 to generate the tachometer signal.

FIG. 6 shows a flow chart 500 for operating controller 202 of FIG. 3. Flow chart 500 begins at step 502 at which point controller 202 reads the input which indicates the desired pressure level. For example, the input may be all input register 202 as illustrated in FIG. 3. Alternatively, the input may be low and high pressure signals, a run point, or a dully cycle signal which generates the register information. Next, an output signal value provided to the system controller is set equal to zero or provided with a frequency proportional to RPMs, depending on the application, at step 504. At step 506, the controller returns to step 502 if no input requesting motor operation has been received. If a motor operation request has been received, the controller proceeds to step 508 wherein the motor starting sequence is initiated based on motor starting parameters which are stored in memory. Generally, current is ramped upward to a given point to provide a soft start of the motor.

At step 510, the controller compares the actual operating parameters of the motor to the parameters set by the input read from step 502. The operating point may be speed, torque, or constant cubic feet per minute operation (CFM). CFM operation may depend on torque and speed such as disclosed in U.S. Pat. Nos. 4,978,896, 4,806,833 or 5,019,757, the entire disclosures of which are incorporated herein by reference. When the actual operating point is less than the point set by the input, the controller operates within loop 512 to increase torque until the actual operating point is equal to or greater than the set point. Loop 512 begins with step 514 wherein the controller looks for motor rotation. If there is no rotation within 3 seconds, loop 512 is terminated, step 516 is executed to set the output signal to zero (including a locked rotor condition to the system controller), and turn the motor off and a two minute delay executed by step 518. Thereafter, the controller returns to step 502 to again read the input and initiate the start cycle. If motor rotation is detected, the controller proceeds to step 520 to sell the motor torque equal to the actual motor torque plus a predefined delta or differential. In other words, the motor torque is increased by a preset amount. At step 522, the output signal is set equal to the frequency, which is proportional to RPM, when frequency control is used. Step 524 times out a preset period used to control time in the loop so that the motor torque changes by increasing or decreasing at specified time intervals. Loop 512 is then completed by returning to step 510 to determine whether or not the increase in torque has caused the actual operating point to equal or exceed the set point. If it has not, loop 512 is again executed.

Once the actual operating point is equal to or exceeds the set point at step 510, the controller proceeds to step 526. If the actual operating point is greater than the set point, loop 528 is executed. The purpose of loop 528 is to reduce the motor torque. At step 530, the motor torque is reduced by an amount delta. At step 532 the signal output is set equal to the frequency, which is proportional to RPM, when frequency control is used. Step 534 times out a preset period used to control time in the loop so that the motor torque changes by increasing or decreasing at specified time intervals. Thereafter, the loop is closed and step 510 is executed again.

When the actual operating point is equal to the set point (allowing for hysteresis), the controller proceeds from step 508 through steps 510 and 526 to step 536 at which point the output is set equal to the signal with frequency proportional to the motor RPMs. At step 538, the input frown the registers or other input is again checked. If the input is requesting the motor to continue to run, step 540 proceeds back to step 510. Otherwise, step 540 proceeds back to the initial read input step 502 to await a request for motor operation.

In view of the above, is will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. In a heating, ventilating and air conditioning system having a motor driven fan for inducing a draft through a vent a control circuit for the motor comprising:
   means for indicating an air pressure corresponding to a desired draft;
   means for sensing the air pressure in the vent;
   means for comparing the indicated pressure to the sensed pressure;
   means responsive to the comparing means for increasing the speed/torque of the motor when the sensed pressure is below the indicated pressure and for decreasing the speed/torque of the motor when the sensed pressure is above the indicated pressure;
   means for measuring a period of time beginning with energizing of the motor to drive the fan; and
   means responsive to the sensing means and the measuring means for disabling the motor in the event that the sensed air pressure in the vent is below the indicated pressure and the measured period of time exceeds a predetermined value.

2. In a heating, ventilating and air conditioning system having a motor driven fan for inducing a draft through a vent, a control circuit for the motor comprising:
   an input register having one or more switches having states which correspond to one or more preset pressures, the state of the one or more switches indicating an air pressure corresponding to a desired draft;
   means for sensing the air pressure in the vent;
   means for comparing the indicated pressure to the sensed pressure; and
   means responsive to the comparing means for increasing the speed/torque of the motor when the sensed pressure is below the indicated pressure and for decreasing the speed/torque of the motor when the sensed pressure is above the indicated pressure.

3. The control circuit of claim 2 wherein the sensing means comprises a pressure sensor for sensing whether the air pressure in the vent is greater than a preset pressure level.

4. In a heating, ventilating and air conditioning system having a motor driven fan for inducing a draft through a vent, a control circuit for the motor comprising:
   means for indicating an air pressure corresponding to a desired draft;
   means for sensing the air pressure in the vent;
   means for comparing the indicated pressure to the sensed pressure;
   means responsive to the comparing means for increasing the speed/torque of the motor when the sensed pressure is below the indicated pressure and for decreasing the speed/torque of the motor when the sensed pressure is above the indicated pressure;
   a controller; and
   an interface connected to the controller, said interface having a first optoisolator for receiving a select signal indicating the selected air pressure and providing to the controller a signal corresponding thereto, said interface having a second optoisolator for receiving a pressure signal indicating the air pressure in the vent and providing to the controller a signal corresponding thereto.

5. The control circuit of claim 4 wherein the pressure sensing means comprises a first pressure sensor providing a positive alternating current half wave for energizing the second optoisolator and a second pressure sensor providing a negative alternating current half wave for energizing the second optoisolator.

6. In a heating, ventilating and air conditioning system having a motor driven fan for inducing a draft through a vent, a control circuit for the motor comprising:
   means for indicating a first or second air pressure corresponding to a desired draft;
   means for sensing the air pressure in the vent;
   means for comparing the first pressure to the sensed pressure;
   means, responsive to the comparing means, for increasing the speed/torque of the motor at a first preset rate when the sensed pressure is below the first pressure and for decreasing the speed/torque of the motor at a second preset rate when the sensed pressure is above the first pressure; and
   means, responsive to the indicating means and to the comparing means, for proportionately increasing the first and second preset rates as a function of the ratios of the second pressure to the first pressure when the second pressure is indicated.

7. The control circuit of claim 6 further comprising:
   means for measuring the period of time beginning with energizing of the motor to drive the fan; and
   means responsive to the sensing means and the measuring means for disabling the motor in the event that the sensed air pressure in the vent is below the indicated pressure and the measured period of time exceeds a predetermined value.

8. The control circuit of claim 6 wherein the indicating means comprises an input register having one or more switches having states which correspond to one or more preset pressures, the state of the one or more switches representing the indicated pressure.

9. The control circuit of claim 6 wherein the sensing means comprises a pleasure sensor for sensing whether the air pressure in the vent is greater than a preset pressure level.

10. The control circuit of claim 6 comprising a controller having an input for receiving a signal corresponding to the indicated air pressure, an input for receiving a signal from the sensing means corresponding to the sensed air pressure and an input for receiving a signal representative of the motor speed/torque, said controller having an output for providing a signal representative of the speed/torque of the motor.

11. The control circuit of claim 6 wherein the first preset rate is equal to the second preset rate.

12. In a heating, ventilating and air conditioning system having a motor driven fan for inducing a draft through a vent, a control circuit for the motor comprising:
   means for indicating a first or second air pressure level corresponding to a desired draft in the vent;
   a first pressure sensor for sensing whether the air pressure in the vent is greater than the first indicated air pressure level;
   a second pressure sensor for sensing whether the air pressure in the vent is greater than the second indicated air pressure level;
   means for comparing the indicated air pressure level to the pressure sensed by the pressure sensor corresponding to the indicated air pressure level; and
   means responsive to the comparing means for increasing the speed/torque of the motor when the corresponding sensed pressure is below the indicated air pressure level and for decreasing the speed/torque of the motor when the corresponding sensed pressure is above the indicated air pressure level.

13. The control circuit of claim 12 further comprising:
   means for measuring the period of time beginning with energizing of the motor to drive the fan; and
   means responsive to the pressure sensor and the measuring means for disabling the motor in the event that the sensed air pressure in the vent is below the indicated pressure level and the measured period of time exceeds a predetermined value.

14. The control circuit of claim 12 wherein the indicating means comprises an input register having one or more switches having states which correspond to one or more preset pressures, the state of the one or more switches representing the indicated pressure level.

15. The control circuit of claim 12 comprising a controller having an input for receiving a signal corresponding to the indicated air pressure level, an input for receiving a signal from the first pressure sensor, an input for receiving a signal from the second pressure sensor, and an input for receiving a signal representative of the motor speed/torque, said controller having an output or providing a signal representative of the speed/torque of the motor.

16. In a heating, ventilating and air conditioning system having a motor driven fan for inducing a draft through a vent, a method for controlling the motor comprising the steps of:
   indicating a first or second air pressure corresponding to a desired draft;
   sensing the air pressure in the vent;
   comparing the first pressure to the sensed pressure;
   increasing the speed/torque of the motor at a first preset rate when the comparing step indicates that the sensed pressure is below the first pressure;
   decreasing the speed/torque of the motor at a second preset rate when the comparing step indicates that the sensed pressure is above the first pressure; and
   proportionately increasing the first and second preset rates as a function of the ratios of the second pressure to the first pressure when the second pressure is indicated.

17. In a heating, ventilating and air conditioning system having a motor driven fan for inducing a draft through a vent, a control circuit for the motor comprising:
   means for indicating a first or second air pressure level corresponding to a desired draft in the vent;
   a first pressure sensor for sensing whether the air pressure in the vent is greater than the first indicated air pressure level;
   a second pressure sensor for sensing whether the air pressure in the vent is greater than the second indicated air pressure level;
   means for comparing the indicated air pressure level to the pressure sensed by the first pressure sensor;
   means for comparing the indicated air pressure level to the pressure sensed by the second pressure sensor; and
   means responsive to both comparing means for increasing the speed/torque of the motor when the sensed pressure is below the indicated air pressure level and for decreasing the speed/torque of the motor when the corresponding sensed pressure is above the indicated air pressure level.

18. The control circuit of claim 17 further comprising a controller and an interface connected to the controller, said interface having a first optoisolator for receiving a select signal indicating the selected air pressure and providing to the controller a signal corresponding thereto, said interface having a second optoisolator for receiving a pressure signal indicating the air pressure in the vent and providing to the controller a signal corresponding thereto.

19. The control circuit of claim 18 wherein the first pressure sensor providing a positive alternating current half wave for energizing the second optoisolator and the second pressure sensor providing a negative alternating current half wave for energizing the second optoisolator.

* * * * *